US012403052B2

(12) United States Patent
Kotagi et al.

(10) Patent No.: US 12,403,052 B2
(45) Date of Patent: Sep. 2, 2025

(54) RAMP SIDERAIL DEPLOYMENT APPARATUS AND METHOD

(71) Applicant: The Braun Corporation, Winamac, IN (US)

(72) Inventors: Vinay Kumar Kotagi, Troy, MI (US); Sasikumar Narayanan, Bangalore (IN); Jacob Rasmussen, Troy, MI (US); Laxman Podili, Bangalore (IN)

(73) Assignee: The Braun Corporation, Winamac, IN (US)

( * ) Notice: Subject to any disclaimer, the term of this patent is extended or adjusted under 35 U.S.C. 154(b) by 684 days.

(21) Appl. No.: 17/839,979

(22) Filed: Jun. 14, 2022

(65) Prior Publication Data

US 2022/0409452 A1 Dec. 29, 2022

Related U.S. Application Data

(60) Provisional application No. 63/215,689, filed on Jun. 28, 2021.

(51) Int. Cl.
*A61G 3/06* (2006.01)

(52) U.S. Cl.
CPC ............. *A61G 3/061* (2013.01); *A61G 3/067* (2016.11)

(58) Field of Classification Search
CPC ......... A61G 3/061; A61G 3/062; A61G 3/067
See application file for complete search history.

(56) References Cited

U.S. PATENT DOCUMENTS

| | | | | |
|---|---|---|---|---|
| 5,636,399 A | | 6/1997 | Tremblay et al. | |
| 5,676,515 A | * | 10/1997 | Haustein | B60P 1/431 414/921 |
| 6,179,545 B1 | * | 1/2001 | Petersen, Jr. | A61G 3/061 14/71.7 |
| 6,598,253 B1 | | 7/2003 | Allen et al. | |
| 6,860,701 B2 | | 3/2005 | Kiser | |
| 8,375,496 B1 | * | 2/2013 | Johnson | A61G 3/067 14/71.3 |
| 8,533,884 B1 | * | 9/2013 | Johnson | A61G 3/067 14/71.3 |

(Continued)

OTHER PUBLICATIONS

International Searching Authority (European Patent Office), International Search Report and Written Opinion, PCT/US2022/034132, Oct. 12, 2022 (10 pages).

*Primary Examiner* — Abigail A Risic
(74) *Attorney, Agent, or Firm* — Daniel Tallitsch; Tyler Schultz

(57) ABSTRACT

A ramp assembly to accommodate a wheel-chaired passenger to enter or to exit a passenger vehicle. The ramp assembly includes a frame having a drive assembly and a ramp subassembly slidably coupled to the frame. The ramp subassembly includes a ramp and a side rail extending along a side of the ramp. A ramp linkage is pivotally coupled to the ramp subassembly. A wheel is coupled to the ramp linkage, wherein rotation of the wheel adjusts a position of the ramp linkage to move the ramp from a lowered position to an inclined position. The ramp subassembly further includes a rail bracket, pivotally connected to the ramp linkage, and a slide bar, located adjacent to the rail bracket. The slide bar is configured to slide along the rail bracket, wherein sliding movement of the slide bar raises and lowers the side rail.

20 Claims, 6 Drawing Sheets

(56) References Cited

U.S. PATENT DOCUMENTS

| | | | | |
|---|---|---|---|---|
| 8,926,254 | B2 | 1/2015 | Pocobello et al. | |
| 10,806,648 | B2 * | 10/2020 | Perkins | B60P 1/431 |
| 10,813,802 | B2 | 10/2020 | Hill et al. | |
| 11,413,198 | B2 | 8/2022 | Smith et al. | |
| 11,912,236 | B2 * | 2/2024 | Sato | A61G 3/067 |
| 2003/0210976 | A1 * | 11/2003 | Koretsky | A61G 3/061 14/71.1 |
| 2011/0146008 | A1 * | 6/2011 | Hansen | A61G 3/067 14/71.1 |
| 2014/0147237 | A1 * | 5/2014 | Rasekhi | B60R 3/02 414/537 |
| 2014/0248109 | A1 | 9/2014 | Johnson et al. | |
| 2019/0106042 | A1 | 4/2019 | Hill et al. | |
| 2019/0247248 | A1 * | 8/2019 | Perkins | B60P 1/431 |
| 2021/0122295 | A1 * | 4/2021 | Sato | A61G 3/061 |
| 2021/0170933 | A1 * | 6/2021 | Smith | B60P 1/431 |

* cited by examiner

RAMP SIDERAIL DEPLOYMENT APPARATUS AND METHOD

CROSS-REFERENCE TO RELATED APPLICATIONS

This application claims priority to U.S. Provisional Patent Application No. 63/215,689, filed on Jun. 28, 2021, the content of which is incorporated herein by reference.

FIELD OF THE DISCLOSURE

The present application relates to a passenger vehicle for transporting one or more passengers, and more particularly to a ramp assembly movable to a raised position for accommodating ingress and egress of a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by altering or adding certain parts or structures within a vehicle to accommodate the physically limited passenger without inconveniencing other passengers or sacrificing space in the vehicle. For example, in one configuration, a van or bus is retrofitted with a ramp to enable a physically limited individual using a wheelchair to enter and exit the vehicle.

In some instances, the ramp is stored below the conventional vehicle floor and deploys to accommodate entry and exit of the physically limited individual through a side door or entrance of the vehicle. Challenges may arise related to stowing the ramp and ensuring that the ramp is flush with the conventional vehicle floor when the ramp is deployed.

SUMMARY

In one embodiment, there is provided a ramp assembly to accommodate a wheel-chaired passenger to enter or exit a passenger vehicle. The ramp assembly includes a frame having a drive assembly, wherein the frame extends longitudinally along a length of the passenger vehicle. A ramp subassembly is slidably coupled to the frame, wherein the ramp subassembly includes a ramp and a side rail extending along a side of the ramp. A ramp linkage includes a first link pivotally coupled to a second link, with the first link being pivotally coupled to the ramp subassembly. A wheel is coupled to the second link, wherein rotation of the wheel adjusts a position of the ramp linkage to move the ramp from a lowered position to an inclined position.

In another embodiment, there is provided a motor vehicle including a floor and a frame, located adjacently to the floor, the frame including a drive assembly and extending longitudinally along a length of the motor vehicle. A ramp subassembly is slidably coupled to the frame, wherein the ramp subassembly includes a ramp and a side rail extending along a side of the ramp. A ramp linkage includes a first link pivotally coupled to a second link, and the first link is pivotally coupled to the ramp subassembly. A wheel is operatively connected to the ramp linkage, wherein rotation of the wheel adjusts a position of the ramp linkage to move the ramp from a lowered position to an inclined position.

In a further embodiment, there is provided a method of raising and lowering a siderail of a ramp assembly including a ramp to accommodate a wheel-chaired passenger to enter or exit a passenger vehicle. The method includes: providing a ramp subassembly including the ramp, the siderail coupled to a ramp bracket, and a drive block; moving the drive block with respect to ramp bracket; and engaging the drive block with the siderail to raise the siderail.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
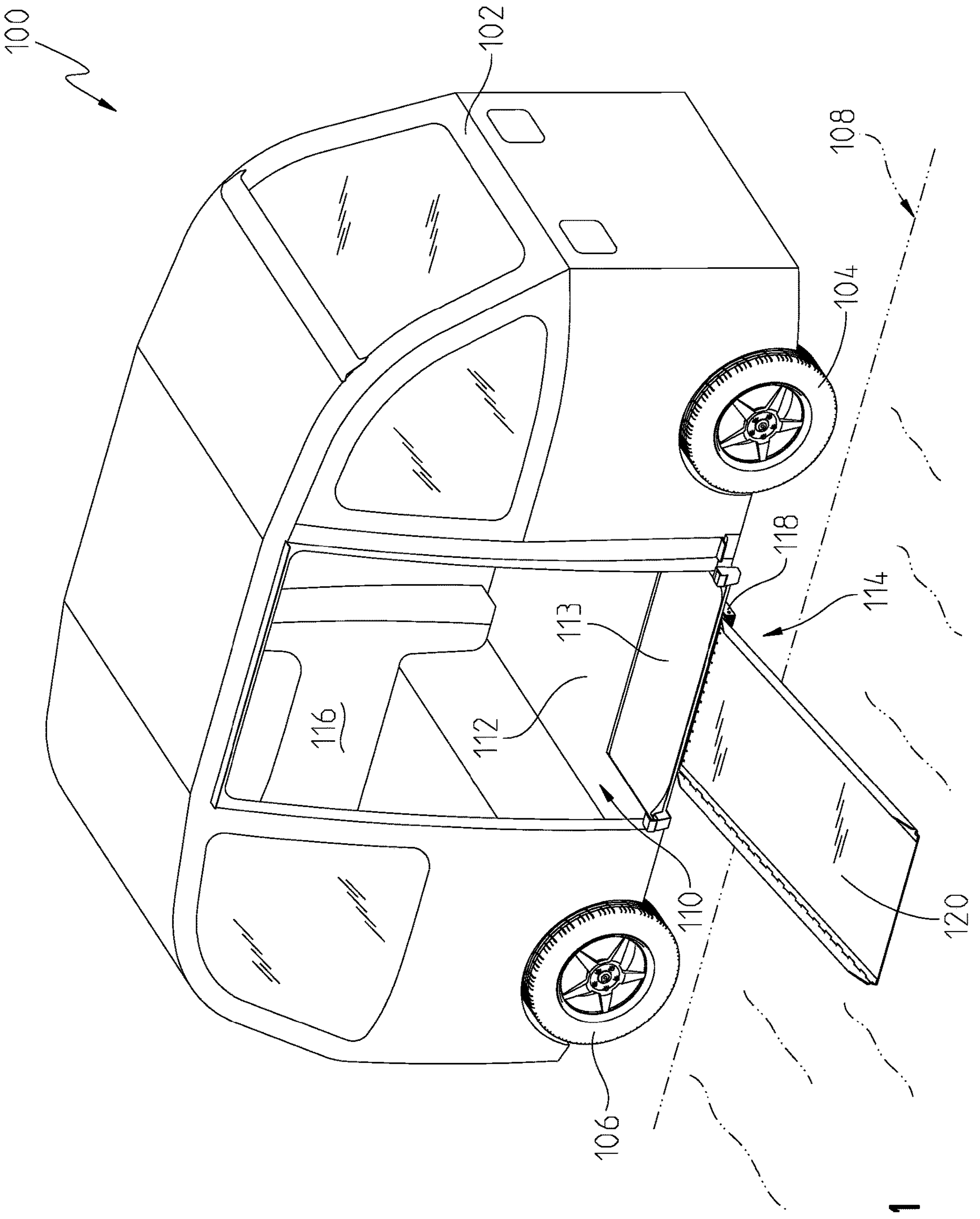
FIG. 1 is a perspective view of a passenger vehicle including a movable ramp.

FIG. 1 illustrates a vehicle 100, commonly identified as a passenger van or bus, available from any number of United States and foreign manufacturers. The vehicle may be a single-level bus, a double-decker bus, or any other type of vehicle. The principles and teachings of the present disclosure may be used for any type of vehicle.

In the illustrative embodiment shown in FIG. 1, the vehicle 100 includes a unibody construction, but other vehicles having a frame on body construction are also included in the present disclosure. Consequently, the use of vehicle herein includes all types and kinds of vehicles with a body on frame construction, a unibody construction, or other constructions. In addition, while the passenger van 100 is illustrated in FIG. 1, the present disclosure is directed to all passenger vehicles carrying one or more passengers including, but not limited to, a bus, motor coach, sport-utility vehicle, truck, taxi, ambulance, or passenger car.

The vehicle 100 includes a frame or chassis 102 operatively coupled to a first pair of wheels 104 and a second pair wheels 106 that propel the vehicle 100 along a ground surface 108. In the illustrative embodiment, the vehicle is shown as a bi-directional vehicle; however, it should be appreciated that in other examples, the vehicle may be one of any number of vehicles suitable for use with the ramp assembly 114 described below. A first passenger opening 110 is located between the first pair wheels 104 and the second pair of wheels 106, and provides access to a passenger for sitting or standing in the vehicle 100. The passenger opening 110 may be modified to increase the size of the opening 110 to provide access, for example, to a passenger seated in a wheelchair to enter and exit the vehicle 100. The vehicle 100 may include a conventional floor 112 extending throughout the vehicle 100 to support passengers and other objects traveling in the vehicle 100.

As shown in FIG. 1, the vehicle 100 may be further modified to include the ramp assembly 114 which provides rolling access of a wheelchair from the ground surface 108 into an interior 116 of the vehicle 100. Prior to deployment, the ramp assembly 114 is positioned adjacent the opening 110 and beneath the conventional floor 112 of the vehicle 100. In other examples, prior to deployment, the ramp assembly 114 is positioned partially beneath a modified portion 113 of the conventional floor 112, and the modified portion 113 is flush with the remainder of the conventional floor 112. In other examples, the modified portion 113 may be sloped such that at least one (but not all) sides of the modified portion 113 are flush with the conventional floor 112. When the ramp 120 is described herein as being "flush with the conventional floor" the phrase is meant to cover each illustrative example of a conventional and/or modified-conventional floor herein. Additionally, as used herein "beneath" means directly underneath while "below" means at a lower height but not necessarily underneath.

Figure 2:
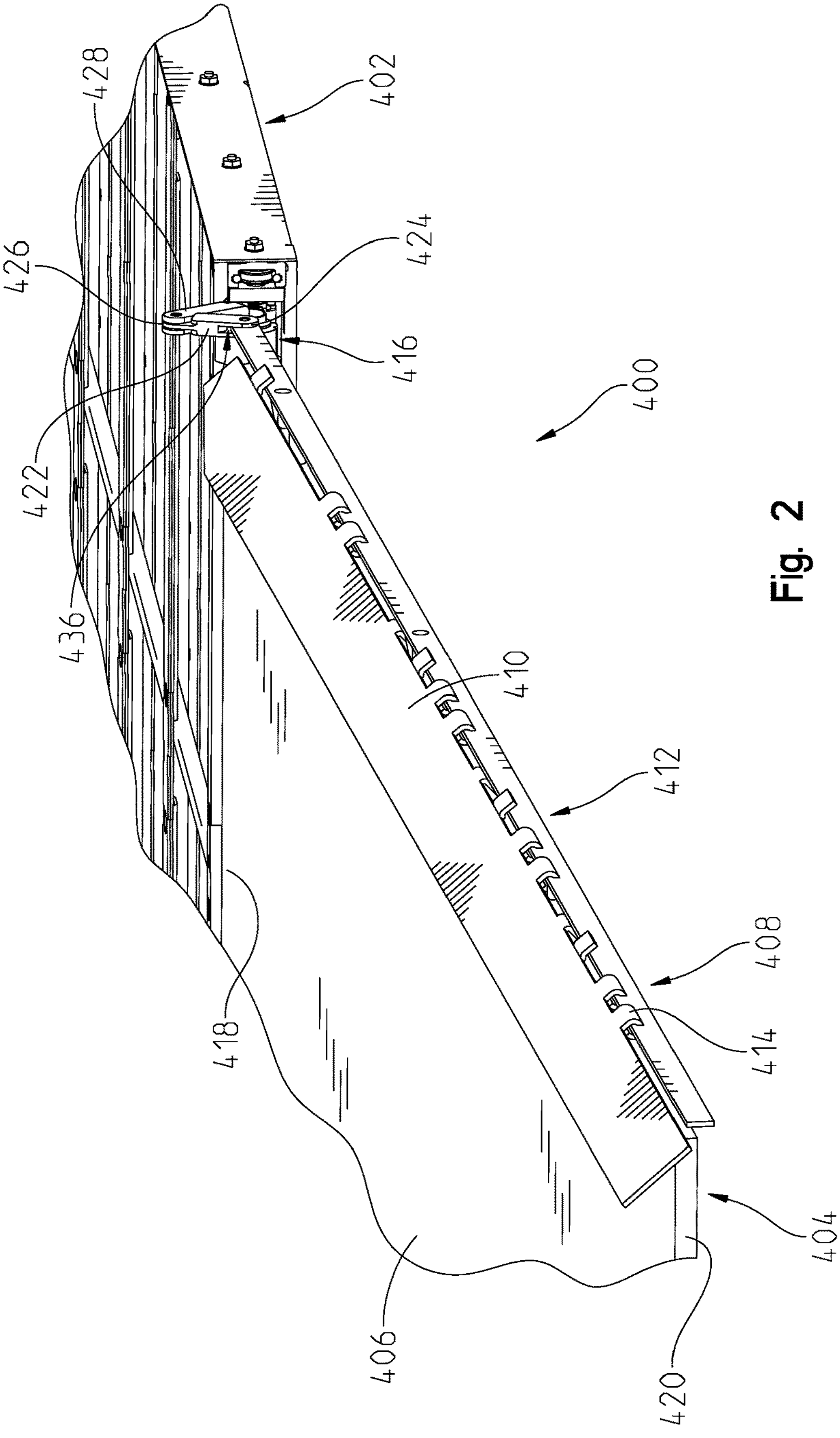
FIG. 2 is a partial perspective view of a portion of one embodiment of a ramp assembly including a ramp and a side rail assembly extending from a ramp frame.

FIG. 2 illustrates a partial perspective view of one embodiment of a ramp assembly 400 including a ramp frame 402 and a ramp sub-assembly 404. The ramp sub-assembly 404 includes a retracted position, not shown, in which the ramp sub-assembly 404 is located within the ramp frame 402. The ramp sub-assembly 404 includes a first extended position, not shown, similar to the position of the ramp 220 shown in FIG. 3. A second extended position of the ramp sub-assembly 404 includes a ramp 406 in a raised position, similar to the position of the ramp 220 shown in FIGS. 4 and 7. The ramp 406 is inclined with respect to a surface upon which the ramp 406 is located.

The ramp sub-assembly 404 includes a side rail assembly 408 including a side rail 410 that is pivotally attached to a side rail bracket 412. The side rail 410 extends longitudinally along a length of the ramp 406. The siderail 410, in one embodiment, includes a longitudinally extending plate having a height sufficient to direct or redirect the wheels of a wheelchair along the ramp surface. While not illustrated, a second rail assembly is located along an opposite side of the ramp 406 having the same or similar configuration as the side rail assembly 408. In one embodiment, a hinge 414 is formed as part of the siderail 410. In other embodiments, the hinge 414 is a separate hinge connecting the side rail 410 to the side rail bracket 412.

Figure 3:
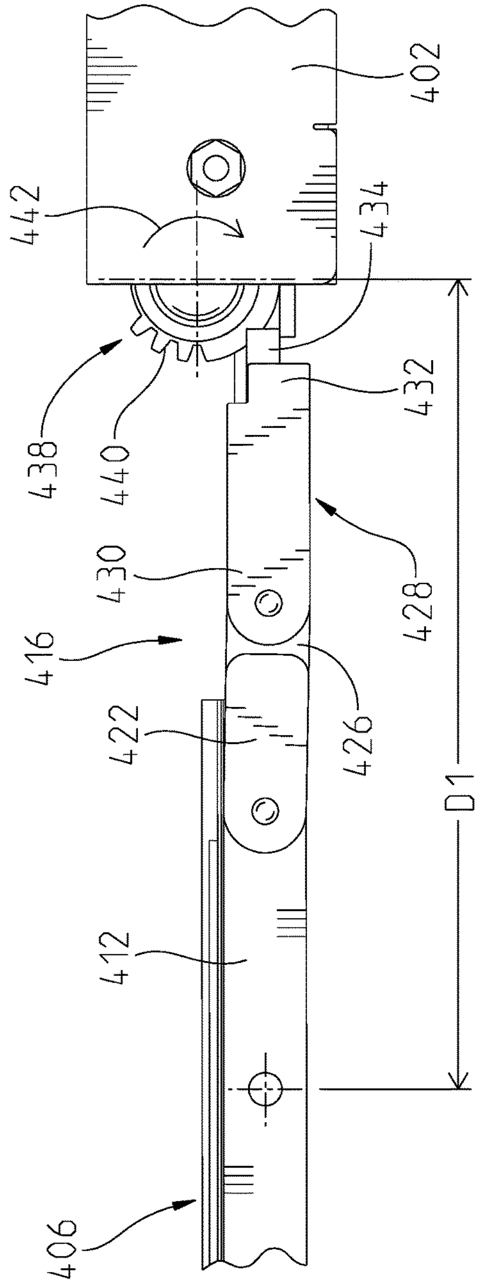
FIG. 3 is a side view of a portion of a ramp assembly showing a ramp in a lowered position next to a ramp frame.
Figure 4:
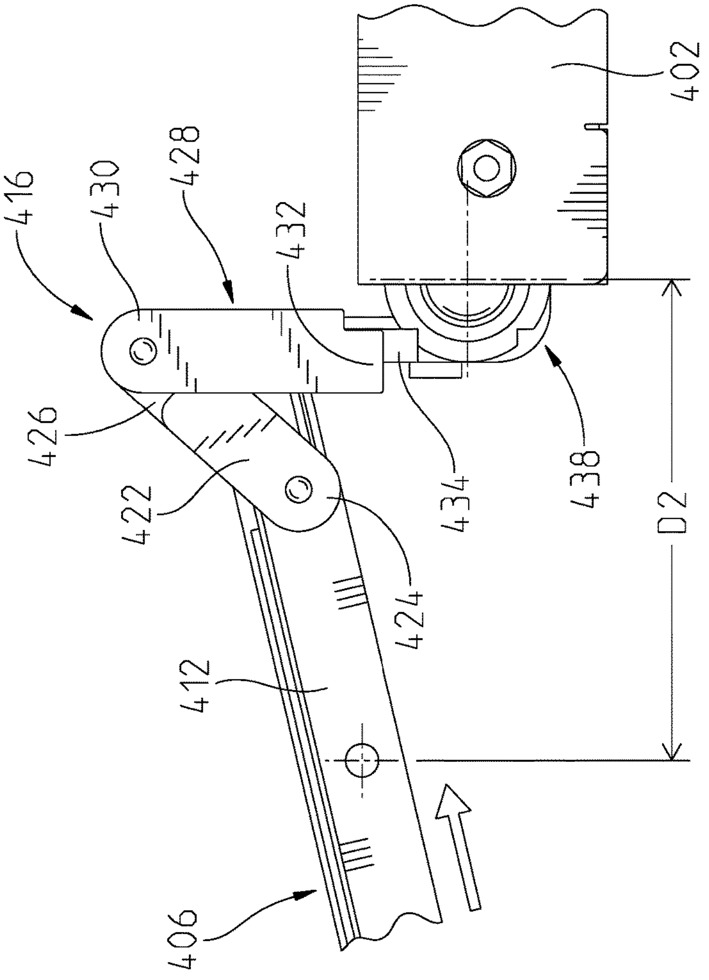
FIG. 4 is a side view of a portion of a ramp assembly showing a ramp in an inclined position next to a ramp frame.

In the extended position of the ramp 406 as illustrated in FIGS. 2, 3, and 4, a ramp linkage 416 raises a first end 418 of the ramp 406 as a second end 420 of the ramp 406 reaches its furthest point of extension from the ramp frame 402. The ramp linkage 416 includes a first link 422, having a first end 424 pivotally coupled to the side rail bracket 412. A second end 426 is pivotally coupled to a second link 428. A first end 430 of the second link 428 is pivotally coupled to the second end 426 and is fixedly coupled at a second end 432 thereof to a connector 434. As seen in FIG. 2, the first link 422 includes a slot 436 defining first and second blades spaced apart to receive an end of the side rail bracket 412.

The connector 434, as seen in FIGS. 3 and 4, is fixedly connected at one end to the second link 428. A second end of second link 428 is fixedly connected to a wheel 438, the same as or similar to the wheel 268 of FIGS. 6A and 6B of U.S. Patent Application Publication No. 2021/0170933 A1 ("the '933 Application"), which is incorporated herein by reference. In FIG. 3, projections 440 engage toothed portions 282 of a cross bar 265 of FIG. 6C of the '933 Application. As the ramp assembly 404 extends a sufficient distance from the ramp frame 416, the wheel 268 engages the cross bar 265 of the '933 Application which rotates the wheel 438 in a direction 442 which starts to raise the connector 434 away from the surface upon which the ramp 406 rests. The movement of the wheel 438 in turn raises the second end 426 to an elevated position such as that illustrated in FIGS. 2 and 4. When the linkage 416 is located in this position, a retracted position, the ramp 406 is in the inclined position to enable a wheelchair or other limited mobility device to move along the ramp 406. In FIG. 3 the linkage 416 is fully extended and in FIG. 4 the linkage 416 is fully retracted.

Figure 5:
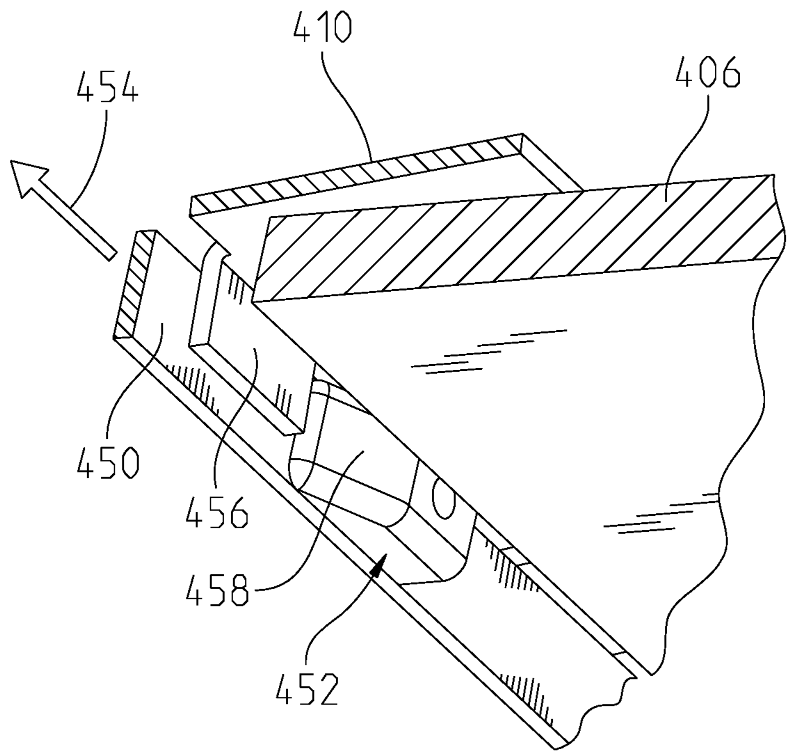
FIG. 5 is a diagrammatic perspective view of an inclined standoff and a siderail in a lowered position.
Figure 6:
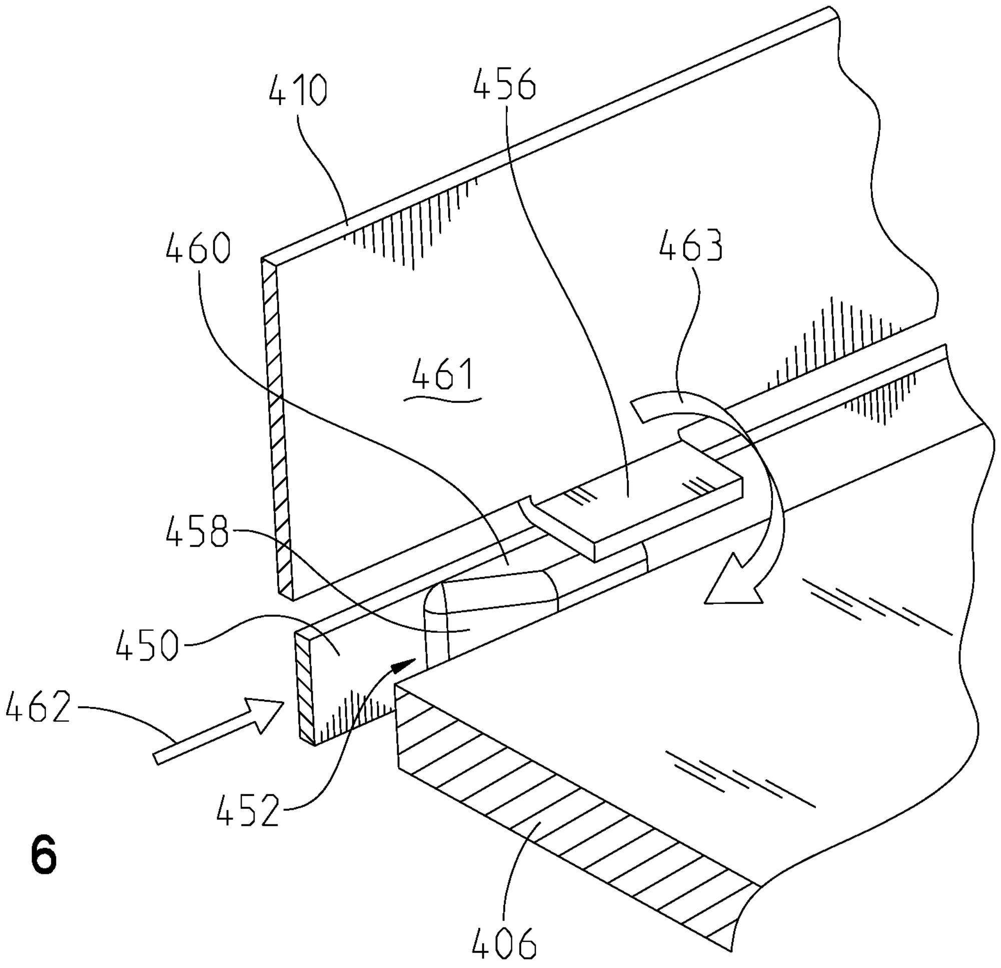
FIG. 6 is a diagrammatic perspective view of an inclined standoff and a siderail in a raised position.

FIGS. 5 and 6 illustrate one embodiment of a raising and lowering of the siderail 410 with respective movement of the ramp 406 and a slide bar 450, including a drive block 452. In this embodiment, the side rail assembly 408 of FIG. 2 is not shown. As the slide bar 450 moves in a direction 454, a flange 456 of the siderail 410 comes into contact with an inclined surface 458, i.e. inclined portion, of the drive block 452. Upon sufficient movement of the slide bar 450, the flange 456 moves along the inclined portion 458, which rotates the side rail 410 about the hinges 414 (not shown in FIG. 5) which moves the siderail 410 to the raised position of FIG. 6. At this location, movement of the slide bar 450 stops, and the flange 456 is located on a flat portion 460 of the drive block 452. In one embodiment, the flange 456 is fixedly coupled to and extends generally perpendicular to a planar surface 461 of the siderail 410.

As the ramp 406 returns to its non-extended position from the extended position, the slide bar 450 moves in a direction 462 to return the side rail 410 in its lowered position. As the slide bar 450 moves in the direction 462, flange 456 moves along the flat portion 460 toward the inclined portion 458. Once the flange 456 starts to move above the inclined portion 458, further movement of the slide bar 450 lowers the ramp in the direction 463. In other embodiments, the drive block 452 is located on a side of the ramp 406 and relative movement of the ramp 406 with the side rail 410 raises and lowers the siderail depending on the direction of relative movement.

The amount of movement of the ramp 406 with respect to the ramp frame 402 is illustrated in FIG. 3 and FIG. 4. A distance D1 of FIG. 3 indicates a first position of the ramp 406 with respect to a line generally shown intersecting a pivot location of the roller 438. As the ramp 406 is elevated, the ramp 406 is pulled toward the frame 402 and a distance D2, which is less than the distance D1, is shown to indicate a distance between the ramp 406 and the ramp frame 402.

Figure 7:
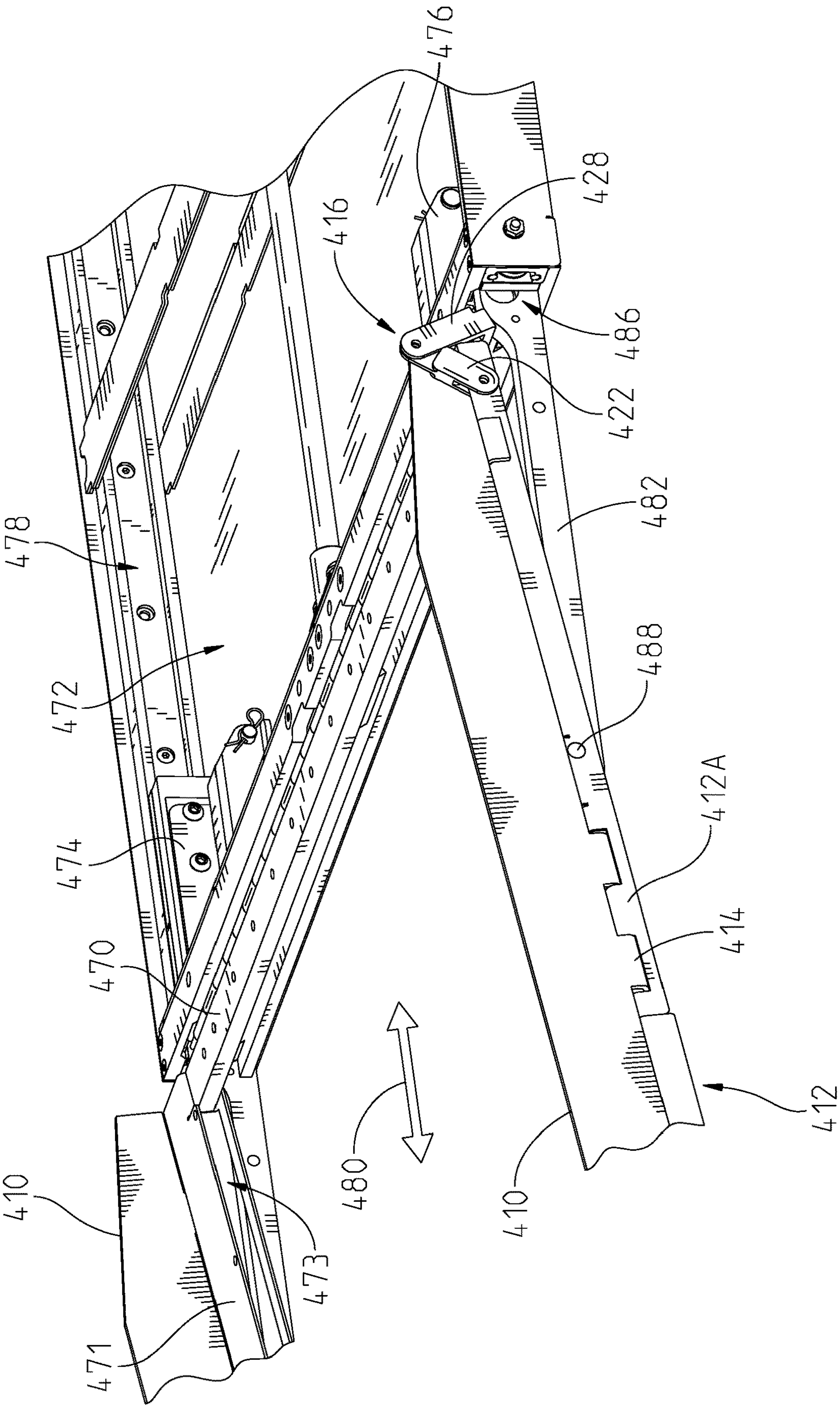
FIG. 7 is a partial perspective right side view of a side rail of a ramp assembly showing the side rail in a partially raised position.

As seen in FIG. 7, the ramp 406 (which is not illustrated) includes a cross-beam 470, which is a part of a frame of the ramp 406. The frame includes a bracket 471 which includes a slot 473. The ramp 406 and its cross-beam 470, are located within the slot 473. The ramp 406 and the cross-beam 470 are fixedly coupled to a drive assembly 472, including drive blocks 474 and 476. The drive assembly 472 utilizes drive blocks similar to or the same as drive blocks 222 shown in and described with the discussion of FIG. 8A of the '933 Application. As the drive blocks 474 and 476 move along a track 478, the cross-beam 470, and therefore the ramp 406, moves along a longitudinal direction 480. As the ramp 406 moves, a leg 482, coupled to the drive assembly 472, moves with the drive assembly 472 as the drive assembly 472 moves the ramp 406 in and out of the ramp frame 402. A portion 486 of the leg 482, partially obscured by the ramp frame 402, is coupled to the drive assembly 472.

The rail bracket 412 includes a pivot pin 488 that extends through the bracket 412A and into the leg 482. The leg 482 includes a slot, not shown, to enable the rail bracket 412 to move along and with respect to the leg 482 when the linkage 416 raises and lowers the first end 418 of the ramp 406. By raising and lowering the ramp assembly 404, the ramp 406 is inclined with respect to the ramp fame 402. Consequently, the linkage 416 moves the rail bracket 412 along the slot of the leg 482.

Figure 8:
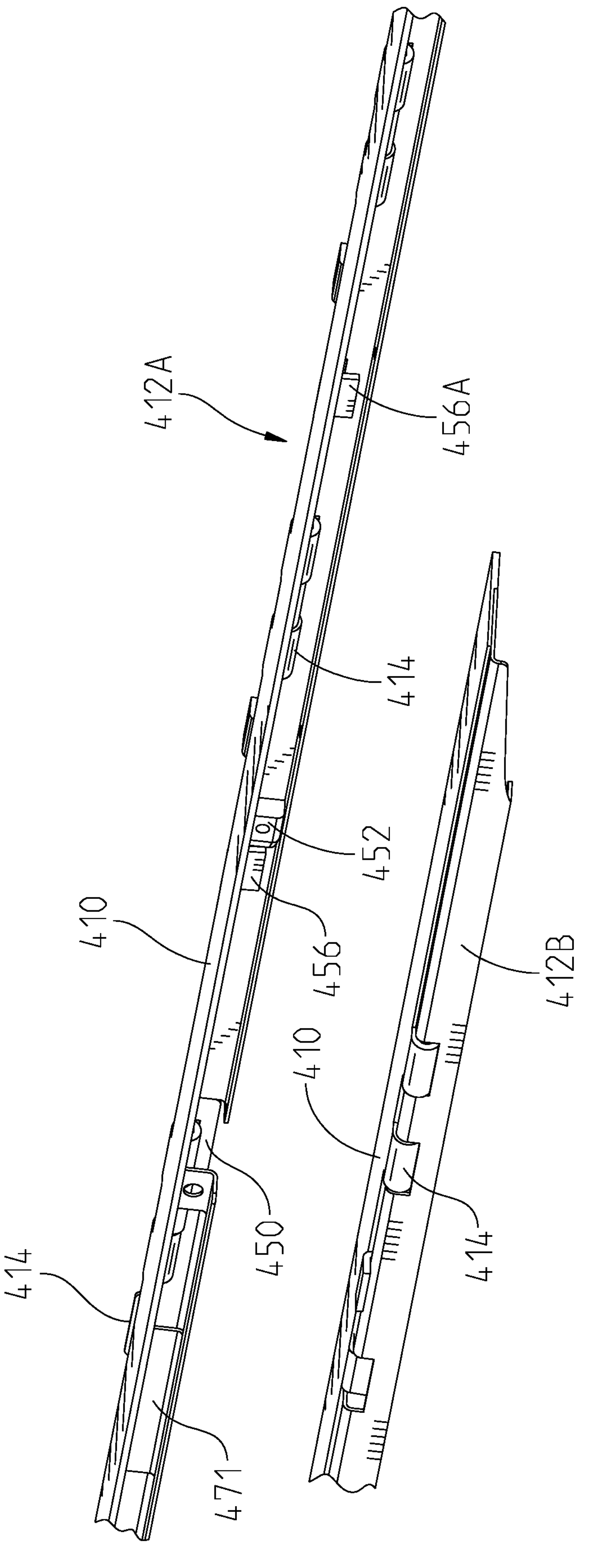
FIG. 8 illustrates a perspective left side view of first and second rail brackets.

FIG. 8 illustrates a perspective left side view of first and second rail brackets 412A and 412B. Bracket 412A is a right side bracket supporting the ramp 402 when looking toward the vehicle from the end 420 of the ramp 406 of FIG. 2. The bracket 412A provides a channel for the slide bar 450 and the attached drive block 452. The slide bar 450 moves along the bracket 412A. While only one drive block is shown, additional drive blocks (not shown) are located on the slide bar 450 to engage flanges 456, such as flange 456A.

The slide bar 450 slidingly engages the bracket 412 and also moves with respect to the ramp 406. While the ramp 406 is fixed with respect to the drive assembly 472, the ramp slide bar 450 is not. Consequently, movement of the ramp linkage 416 not only raises the ramp 406 but also moves the slide bar 450 along the bracket 412 in both directions, a reciprocating movement, which moves the siderail 410 from a lowered position to a raised position and back to a lowered position.

The ramp 406 also moves, or slides, within the ramp sub-assembly 404 such that the ramp 406 moves with respect to the side rail assembly 408. Ramp linkage 416 which moves from the position of FIG. 3 to the position of FIG. 4 moves the ramp 406 to the inclined position.

While exemplary embodiments incorporating the principles of the present invention have been disclosed herein, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A ramp assembly to accommodate a wheel-chaired passenger to enter or exit a passenger vehicle, the ramp assembly comprising:

a frame including a drive assembly, the frame extending longitudinally along a length of the passenger vehicle; and, a ramp subassembly slidably coupled to the frame, the ramp subassembly including a ramp, a side rail extending along a side of the ramp, a rail bracket, and a slide bar;

wherein the slide bar is located adjacent the rail bracket and sliding movement of the slide bar along the rail bracket moves the side rail between a lowered position and a raised position with respect to the ramp, whereby the slide bar is configured to engage with the side rail to hold the side rail in the raised position.

2. The ramp assembly of claim 1 further comprising:

a ramp linkage including a first link pivotally coupled to a second link, the first link being pivotally coupled to the ramp subassembly; and a wheel coupled to the second link, wherein rotation of the wheel adjusts a position of the ramp linkage to move the ramp from a lowered position to an inclined position;

wherein the rail bracket is pivotally connected to the first link.

3. The ramp assembly of claim 1 further comprising a drive block connected to the slide bar, wherein movement of the slide bar moves the drive block with respect to the rail bracket to move the side rail between the lowered position and the raised position.

4. The ramp assembly of claim 3 wherein the side rail includes a flange and contact of the drive block with the flange moves the side rail between the lowered position and the raised position.

5. The ramp assembly of claim 4 wherein the drive block includes an inclined portion, wherein movement of the slide bar toward the flange engages in inclined portion with the flange to move the siderail from the lowered position to the raised position.

6. The ramp assembly of claim 5 wherein the drive block includes a flat portion located next to the inclined portion, wherein further movement of the slide bar past the inclined portion places the flange at the flat portion to completely raise the side rail.

7. The ramp assembly of claim 6 wherein the drive block includes a flat portion located next to the inclined portion.

8. The ramp assembly of claim 7 wherein the flat portion supports the flange when the side rail is in the raised position.

9. The ramp assembly of claim 2 wherein the ramp subassembly includes a leg extending from the frame, the leg including a slot and the rail bracket includes pivot pin extending through the slot wherein movement of the ramp linkage moves the pivot pin along the slot.

10. A motor vehicle comprising:

a floor;

a frame, located adjacently to the floor, the frame including a drive assembly and extending longitudinally along a length of the motor vehicle; and, a ramp subassembly slidably coupled to the frame, the ramp subassembly including a ramp, a side rail extending along a side of the ramp, a rail bracket, and a slide bar;

wherein the slide bar is located adjacent the rail bracket and sliding movement of the slide bar along the rail bracket moves the side rail between a lowered position and a raised position with respect to the ramp, whereby the slide bar is configured to engage with the side rail to hold the side rail in the raised position.

11. The motor vehicle of claim 10, further comprising:

a ramp linkage including a first link pivotally coupled to a second link, the first link pivotally coupled to the ramp subassembly; and a wheel operatively connected to the ramp linkage, wherein rotation of the wheel adjusts a position of the ramp linkage to move the ramp from a lowered position to an inclined position;

wherein the rail bracket is pivotally connected to the first link.

12. The motor vehicle of claim 10 further comprising a drive block connected to the slide bar, wherein movement of the slide bar moves the drive block with respect to the rail bracket to move the side rail between the lowered position and the raised position.

13. The motor vehicle of claim 12 wherein the side rail includes a flange and contact of the drive block with the flange moves the side rail between the lowered position and the raised position.

14. The motor vehicle of claim 13 wherein the drive block includes an inclined portion, wherein movement of the slide bar toward the flange engages in inclined portion with the flange to move the siderail from the lowered position to the raised position.

15. The motor vehicle of claim 14 wherein the drive block includes a flat portion located next to the inclined portion, wherein further movement of the slide bar past the inclined portion places the flange at the flat portion to completely raise the side rail.

16. The motor vehicle of claim 15 wherein the drive block includes a flat portion located next to the inclined portion, wherein the flat portion supports the flange when the side rail is in the raised position.

17. A method of raising and lowering a siderail of a ramp assembly including a ramp to accommodate a wheel-chaired passenger to enter or exit a passenger vehicle, the method comprising:

providing a ramp subassembly including the ramp, the siderail coupled to a ramp bracket, and a drive block;

moving the drive block with respect to ramp bracket; and engaging the drive block with the siderail to hold the siderail in a raised position.

18. The method of claim 17 further comprising:

disengaging the drive block with the siderail to lower the siderail.

19. The method of claim 18 wherein the moving the drive block with respect to the ramp bracket includes moving a slide bar, coupled to the drive block, with respect to the ramp bracket.

20. The method of claim 19 wherein the moving the drive block with respect to the ramp bracket includes moving the ramp, coupled to the drive block, with respect to the ramp bracket.

* * * * *